(12) United States Patent
Tartaglia et al.

(10) Patent No.: US 11,716,270 B2
(45) Date of Patent: Aug. 1, 2023

(54) DETERMINING RELIABILITY INFORMATION FOR A NETWORK COMPONENT

(71) Applicant: Telefonaktiebolaget LM Ericsson (publ), Stockholm (SE)

(72) Inventors: Antonio Tartaglia, Genoa (IT); Roberto Magri, Genoa (IT); Ulf Ekstedt, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/272,493

(22) PCT Filed: Aug. 31, 2018

(86) PCT No.: PCT/EP2018/073532
§ 371 (c)(1),
(2) Date: Mar. 1, 2021

(87) PCT Pub. No.: WO2020/043317
PCT Pub. Date: Mar. 5, 2020

(65) Prior Publication Data
US 2021/0320855 A1 Oct. 14, 2021

(51) Int. Cl.
*H04L 43/0817* (2022.01)
*H04L 43/16* (2022.01)

(52) U.S. Cl.
CPC .......... *H04L 43/0817* (2013.01); *H04L 43/16* (2013.01)

(58) Field of Classification Search
CPC ...... H04L 43/0817; H04L 43/16; H04W 8/30; H04W 24/04
USPC .......................................................... 370/241
See application file for complete search history.

(56) References Cited

U.S. PATENT DOCUMENTS

| 6,754,843 | B1 * | 6/2004 | Lu | H04L 41/12 370/254 |
| 8,751,421 | B2 | 6/2014 | Anderson et al. | |
| 9,621,421 | B1 * | 4/2017 | Tolentino | H04L 41/0816 |
| 9,869,722 | B1 | 1/2018 | Morris | |

(Continued)

FOREIGN PATENT DOCUMENTS

| CN | 108259101 A | 7/2018 |
| JP | 2008211725 A | 9/2008 |

OTHER PUBLICATIONS

Reliawiki, "The Weibull Distribution", Aug. 9, 2018, pp. 1-49, retrieved from the internet: http://reliawiki.org/index.php/The_Weibull_Distribution.

(Continued)

*Primary Examiner* — Meng Vang
(74) *Attorney, Agent, or Firm* — Coats & Bennett, PLLC (57) ABSTRACT

The present disclosure relates to a method, apparatus and system for determining reliability information for a network component (240) of a telecommunications network. The disclosed method comprises: obtaining (310) a plurality of samples of an operating parameter of the network component (240) acquired over a period of time; determining (320) a value of an acceleration factor based on the plurality of samples, the acceleration factor corresponding to an effect of the operating parameter over time on the network component (240); and determining (330) the reliability information based on the determined value of the acceleration factor.

14 Claims, 6 Drawing Sheets

(56) References Cited

U.S. PATENT DOCUMENTS

| | | | | |
|---|---|---|---|---|
| 9,985,823 | B1* | 5/2018 | Holenstein | H04L 67/1095 |
| 10,637,762 | B1* | 4/2020 | Traylor | H04L 67/322 |
| 2007/0058554 | A1* | 3/2007 | Benlarbi | H04L 41/5009 |
| | | | | 370/469 |
| 2007/0192474 | A1* | 8/2007 | Decasper | H04L 67/306 |
| | | | | 709/223 |
| 2011/0131011 | A1* | 6/2011 | Blackledge | H04L 43/10 |
| | | | | 702/186 |
| 2013/0108261 | A1* | 5/2013 | Jiang | H04B 10/69 |
| | | | | 398/38 |
| 2014/0214354 | A1 | 7/2014 | Dreifus et al. | |
| 2015/0243155 | A1* | 8/2015 | Xiong | G08B 21/182 |
| | | | | 398/135 |

OTHER PUBLICATIONS

Gu, C. et al., "Ambient Use-Condition Models for Reliability Assessment", IEEE 06CH37728 44th Annual International Reliability Physics Symposium, Jan. 1, 2006, pp. 299-306, IEEE.

Finisar, "Digital Diagnostic Monitoring Interface for SFP and SFP+ Optical Transceivers", Revision E2, Apr. 4, 2014, pp. 1-32, AN-2030, Finisar.

* cited by examiner

DETERMINING RELIABILITY INFORMATION FOR A NETWORK COMPONENT

TECHNICAL FIELD

The present disclosure relates to a method, an apparatus and a system for determining reliability information for a network component.

BACKGROUND

Optical transceivers are used in virtually all telecommunications networking equipment, from radio access nodes to the packet core and transport networks. An optical transceiver is a subsystem consisting of an optical transmitter (e.g. a laser), an optical receiver, front-end high speed analogue electronics and low speed electronics for monitoring and control. The reliability of such subsystems is predicted by each manufacturer according to well-coded methodologies, consisting of a theoretical calculation of the Mean Time to Failure (MTTF) or, equivalently, of the Failure rate In Time (FIT).

The MTTF/FIT estimate is calculated assuming certain ambient temperature and humidity conditions for the optical transceiver. Ambient temperature and humidity are the two parameters that have the greatest influence on failure mechanisms. These conditions are assumed to be static for the calculation of the MTTF/FIT estimate, and the resulting MTTF/FIT estimate values are used as indicators of the likelihood of failure of a certain number of individual optical transceiver units a given time interval (or the likelihood of failure of a single individual optical transceiver unit after a certain number of accumulated working hours under these conditions), and hence to dimension spare parts inventory for that type of transceiver.

Whilst MTTF/FIT estimates are calculated assuming certain constant ambient temperature and humidity conditions, the actual environmental conditions to which an optical transceiver is exposed in use vary with time. Variations in the operating temperature of an optical transceiver can be caused by factors such as external temperature variations arising from day/night cycles, different thermal gradients in the external temperature arising from varying power consumption in networking equipment, accidental events like air conditioning failure and repair and the like. (Humidity is relatively less important, as the optical transmitter, which is the component of an optical transceiver that is most prone to failure, is usually hermetically sealed and impervious to moisture that may be present in the environment).

Similar techniques are used to estimate the reliability of other network components used in telecommunications networks, and similar limitations apply to the techniques used to estimate reliability of other network components.

As existing techniques for estimating reliability information assume that operating conditions such as temperature and humidity experienced by network components are constant over the operational life of the component, they do not capture the real thermal history of the network component during operation of the network component, and thus do not provide an accurate estimate of the operational life that can be expected of a network component in real-world operating conditions. This can lead either to over-specifying elements or subsystems of the network component, or to neglecting to account for accidental events that could cause the network component to operate in conditions for which it is not specified.

Thus, a desire exists to improve reliability estimates for network components taking into account actual operating conditions experienced by the network components during operation.

Techniques have been proposed for providing reliability estimates in other technical fields. For example, U.S. Pat. No. 8,751,421 describes a machine learning system capable of producing mean time between failure (MTBF) estimates for components of an electrical power distribution grid. US 2014/214354 describes a system and method for multi-dimensional automated computer-analysed device performance measurement of various discrete condition aspects of a component such as a semiconductor, expressed by example in an integrated circuit, to assess operating conduction, longevity and performance related issues.

SUMMARY

According to a first aspect of the invention, there is provided a method for determining reliability information for a network component of a telecommunications network. The method comprises: obtaining a plurality of samples of an operating parameter of the network component acquired over a period of time; determining a value of an acceleration factor based on the plurality of samples, the acceleration factor corresponding to an effect of the operating parameter over time on the network component; and determining the reliability information based on the determined value of the acceleration factor.

The operating parameter may comprise an environmental parameter of an operating environment of the network component, for example.

The method may further comprise: at predetermined intervals, obtaining a sample of the operating parameter from the network component; and storing the sample of the operating parameter in a database.

Obtaining the plurality of samples of the operating parameter may comprise obtaining the plurality of samples of the operating parameter from the database.

The reliability information may comprise a Mean Time to Failure, MTTF, metric.

The method may further comprise: obtaining a notional MTTF for the network component; and generating the MTTF metric based on the notional MTTF and the determined value of the acceleration factor.

The acceleration factor may be determined based on the plurality of samples and on a reliability model for the network component.

Generating the MTTF metric may comprise: determining the value of the acceleration factor according to the equation:

$$A_{f\_eq} = \frac{1}{t-use} \int_0^{t-use} Af(Tu(t))dt,$$

where: $A_{f\_eq}$ is value of the acceleration factor; t–use is a total time period covered by the plurality of samples; Af is a notional acceleration factor obtained from a reliability model for the network component; and Tu(t) is a value of a sample of the operating parameter at time t; and determining the MTTF metric according to the equation: $MTTF_u = MTTF_{spec} * A_{f\_eq}$, where $MTTF_{spec}$ is the notional MTTF for the network component.

The method may further comprise: obtaining network management information relating to a network in which the network component is deployed; and using the reliability information in conjunction with the obtained network management information to: determine maintenance requirements of the network component; or identify a stressed or relaxed location in the network.

The method may further comprise: comparing the determined reliability information to a threshold and, if the determined reliability information meets the threshold, triggering a warning.

The network component may comprise an optical transceiver, for example.

The environmental parameter may comprise a temperature or a humidity.

According to a second aspect of the invention there is provided apparatus for determining reliability information for a network component of a telecommunications network. The apparatus comprises: a processor; and a memory, wherein the memory contains instructions executable by the processor whereby the apparatus is operative to: obtain a plurality of samples of an operating parameter of the network component acquired over a period of time; determine a value of an acceleration factor based on the plurality of samples, the acceleration factor corresponding to an effect of the operating parameter over time on the network component; and determine the reliability information based on the determined value of the acceleration factor.

The operating parameter may comprise an environmental parameter of an operating environment of the network component, for example.

The apparatus may be further operative to: obtain a sample of the operating parameter from the network component at predetermined intervals; and store the sample of the operating parameter in the database.

The apparatus may be operative to obtain the plurality of samples from the database.

The reliability information may comprises a Mean Time to Failure, MTTF, metric.

The apparatus may be further operative to: obtain a notional MTTF for the network component; and generate the MTTF metric based on the notional MTTF and the determined value of the acceleration factor.

The apparatus may be operative to determine the acceleration factor based on the plurality of samples and on a reliability model for the network component.

The apparatus may be further operative to: determine the value of the acceleration factor according to the equation:

$$A_{f\_eq} = \frac{1}{t-use} \int_0^{t-use} Af(Tu(t))dt,$$

where: $A_{f\_eq}$ is the value of the acceleration factor; t−use is a total time period covered by the plurality of samples; Af is a notional acceleration factor value obtained from a reliability model for the component; and Tu(t) is a value of a sample of the operating parameter at time t; and determine the MTTF metric according to the equation: $MTTF_u = MTTF_{spec} * A_{f\_eq}$, where $MTTF_{spec}$ is the notional MTTF for the network component.

The apparatus may be further operative to: obtain network management information relating to a network in which the network component is deployed; and use the reliability information in conjunction with the obtained network management information to: determine maintenance requirements of the network component; or identify a stressed or relaxed location in the network.

The apparatus may be further operative to: compare the determined reliability information to a threshold and, if the determined reliability information meets the threshold, issue a warning.

The network component may comprise an optical transceiver, for example.

The environmental parameter may comprise a temperature or a humidity.

According to a third aspect of the invention there is provided a system for determining reliability information for a network component of a telecommunications network. The system comprises: a data processing entity configured to: obtain a plurality of samples of an operating parameter of the network component acquired over a period of time; determine a value of an acceleration factor based on the plurality of samples, the acceleration factor corresponding to an effect of the operating parameter over time on the network component; and determine the reliability information based on the determined value of the acceleration factor.

The operating parameter may comprise an environmental parameter of an operating environment of the network component, for example.

The system may further comprise a database, and the data processing entity may be further configured to: obtain a sample of the operating parameter from the network component at predetermined intervals; and store the sample of the operating parameter in the database.

The data processing entity may be configured to obtain the plurality of samples of the operating parameter from the database.

The reliability information may comprise a Mean Time to Failure, MTTF, metric.

The data processing entity may be further configured to: obtain a notional MTTF for the network component; and generate the MTTF metric based on the notional MTTF and the determined acceleration factor.

The data processing entity may be configured to determine the acceleration factor based on the plurality of samples and on a reliability model for the network component.

The data processing entity may be configured to: determine the value of the acceleration factor according to the equation:

$$A_{f\_eq} = \frac{1}{t-use} \int_0^{t-use} Af(Tu(t))dt,$$

where: $A_{f\_eq}$ is the value of the acceleration factor; t−use is a total time period covered by the plurality of samples; Af is a notional acceleration factor obtained from a reliability model for the component; and Tu(t) is a value of a sample of the operating parameter at time t; and determine the MTTF metric according to the equation: $MTTF_u = MTTF_{spec} * A_{f\_eq}$, where $MTTF_{spec}$ is the notional MTTF for the network component.

The data processing entity may be further configured to: obtain network management information relating to a network in which the network component is deployed; and use the reliability information in conjunction with the obtained network management information to: detect maintenance requirements of the network component; or identify a stressed or relaxed location in the network.

The data processing entity may be further configured to: compare the determined reliability information to a threshold and, if the determined reliability information meets the threshold, trigger a warning.

The network component may comprise an optical transceiver, for example.

The environmental parameter may comprise a temperature or a humidity.

According to a fourth aspect of the invention there is provided a computer program comprising instructions which, when executed on at least one processor, cause the at least one processor to carry out a method according to the first aspect.

According to a fifth aspect of the invention there is provided a carrier containing a computer program according to the fourth aspect, wherein the carrier comprises one of an electronic signal, optical signal, radio signal or computer readable storage medium.

According to a sixth aspect of the invention there is provided a computer program product comprising non transitory computer readable media having stored thereon a computer program according to the fourth aspect.

BRIEF DESCRIPTION OF THE DRAWINGS

Embodiments of the disclosure will now be described, strictly by way of example only, with reference to the accompanying drawings, of which.

DETAILED DESCRIPTION

Network component suppliers typically specify a notional MTTF value for a network component for a specified period of time $T_{spec}$. This period of time is the interval where random failures occur and the failure rate is considered to be constant.

Figure 1:
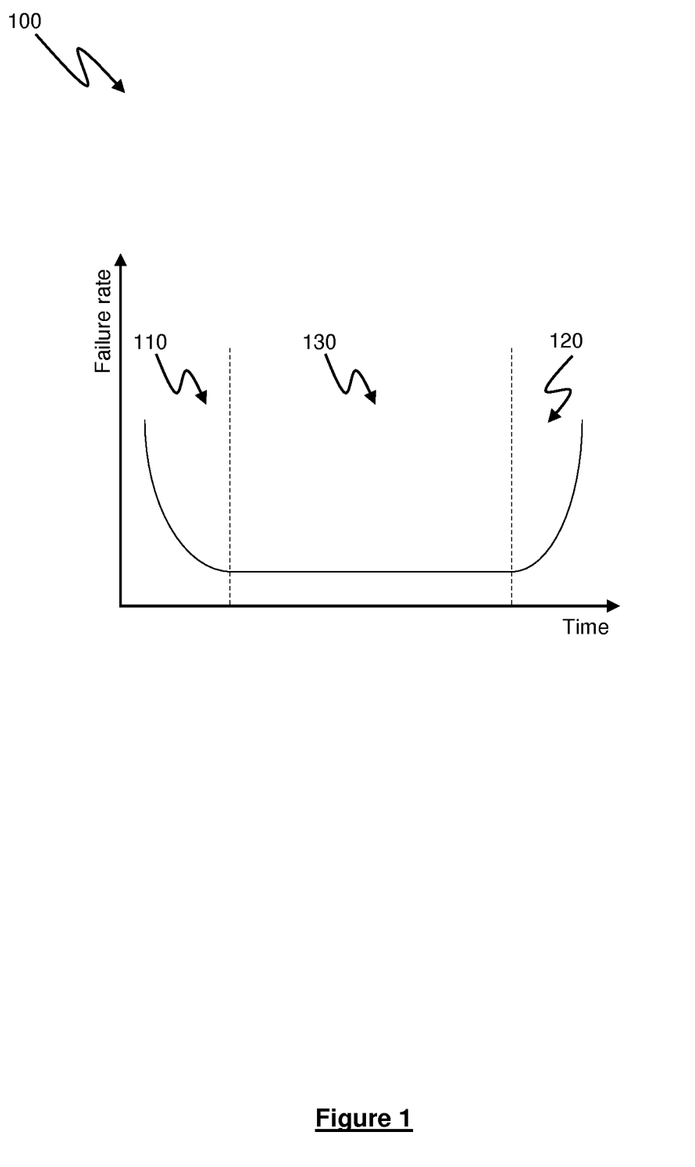
FIG. 1 is a graph showing typical failure rate over time for a network component.
Figure 3:
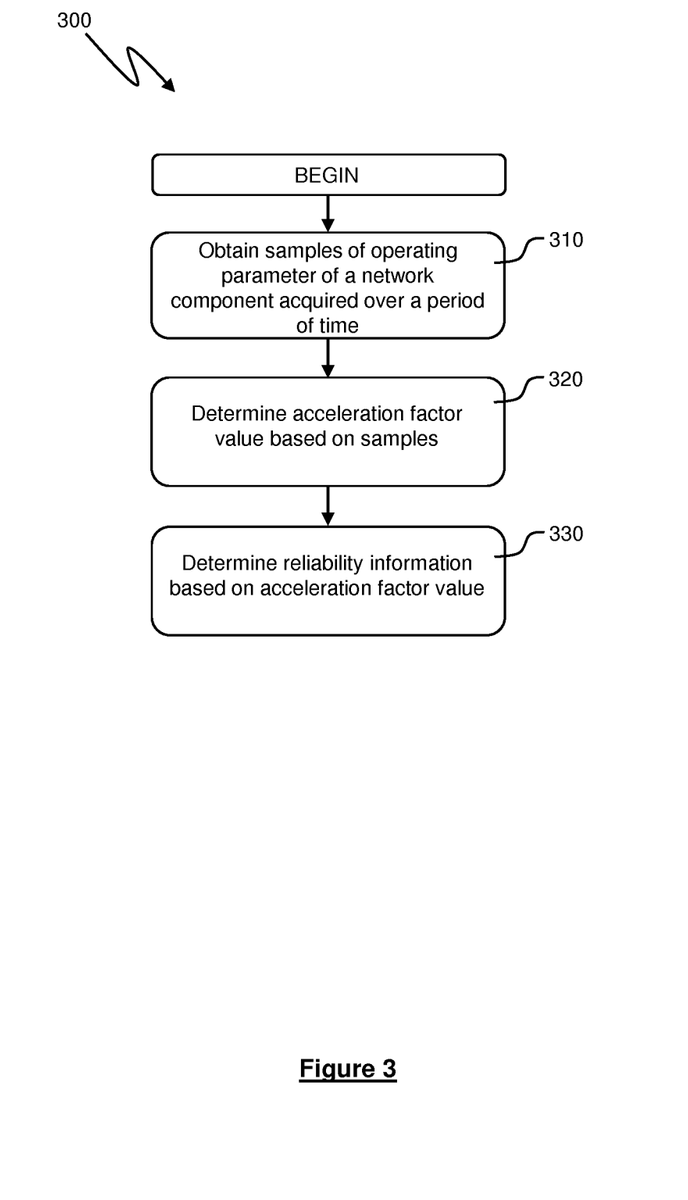
FIG. 3 is a flow diagram for a method performed by a data processing entity for determining reliability information for a network component of a telecommunications network.

FIG. 1 is an exemplary graph of failure rate over time. The graph 100 of FIG. 3 shows a typical "bathtub curve" which includes a first portion 110 at the left-hand side (small time values) of the graph, which shows a relatively high initial failure rate which decreases over time, representing a relatively high likelihood of failure of a component in the early part of its operating life, which reflects the possibility that a component may suffer from unnoticed manufacturing defects that cause the component to fail early in its operational life. The bathtub curve of the graph 100 also includes a second portion 120 at the right-hand side (large time values) which shows an increasing failure rate over time, which reflects the increased likelihood of component failure towards the end of its operational life. Between the first portion 110 and the second portion 120 is a third portion 130, which represents the normal operational life of the component, during which the failure rate is considered constant. This portion of the graph 100 is the specified period $T_{spec}$ that is typically used by component suppliers to calculate the notional MTTF of a component.

The notional MTTF calculation is associated with the specified period $T_{spec}$ and with a specified use temperature $t_u$. Thus, in calculating the notional MTTF the first and second portions 110, 120 are typically disregarded.

The notional MTTF can be calculated by operating a number of identical sample components at the specified use temperature to until the components under test fail. The average time taken for the components under test to fail is calculated and used as the MTTF.

However, in order to accelerate component testing for the purpose of calculating the notional MTTF, component suppliers typically operate a number of identical sample components at a test temperature $t_{test}$ that is higher than the specified use temperature $t_u$ until the components under test fail. The mean time $MTTF_{test}$ taken for the components under test to fail is calculated, and is then scaled by an acceleration factor which represents the effect of the increased test temperature on the average time to failure of the components under test to obtain the notional MTTF for components of the type being tested. The Arrhenius model is often used to calculate this acceleration factor according to the equation:

$$Af = e^{\left(\frac{Ea}{k}\left(\frac{1}{t_u} - \frac{1}{t_{test}}\right)\right)},$$

where:
Af is the acceleration factor;
Ea is an activation energy value;
k is the Boltzmann constant;
$t_u$ is the specified use temperature; and
$t_{test}$ is the test temperature.

The notional MTTF $MTTF_{spec}$ is then calculated by multiplying the mean time $MTTF_{test}$ taken for the components under test to fail by the calculated acceleration factor Af, i.e.:

$$MTTF_{spec} = Af\ MTTF_{test}.$$

As this method assumes that the use temperature to is constant, the method does not take into account the actual operating conditions experienced by a network component deployed in a telecommunications network.

Figure 2:
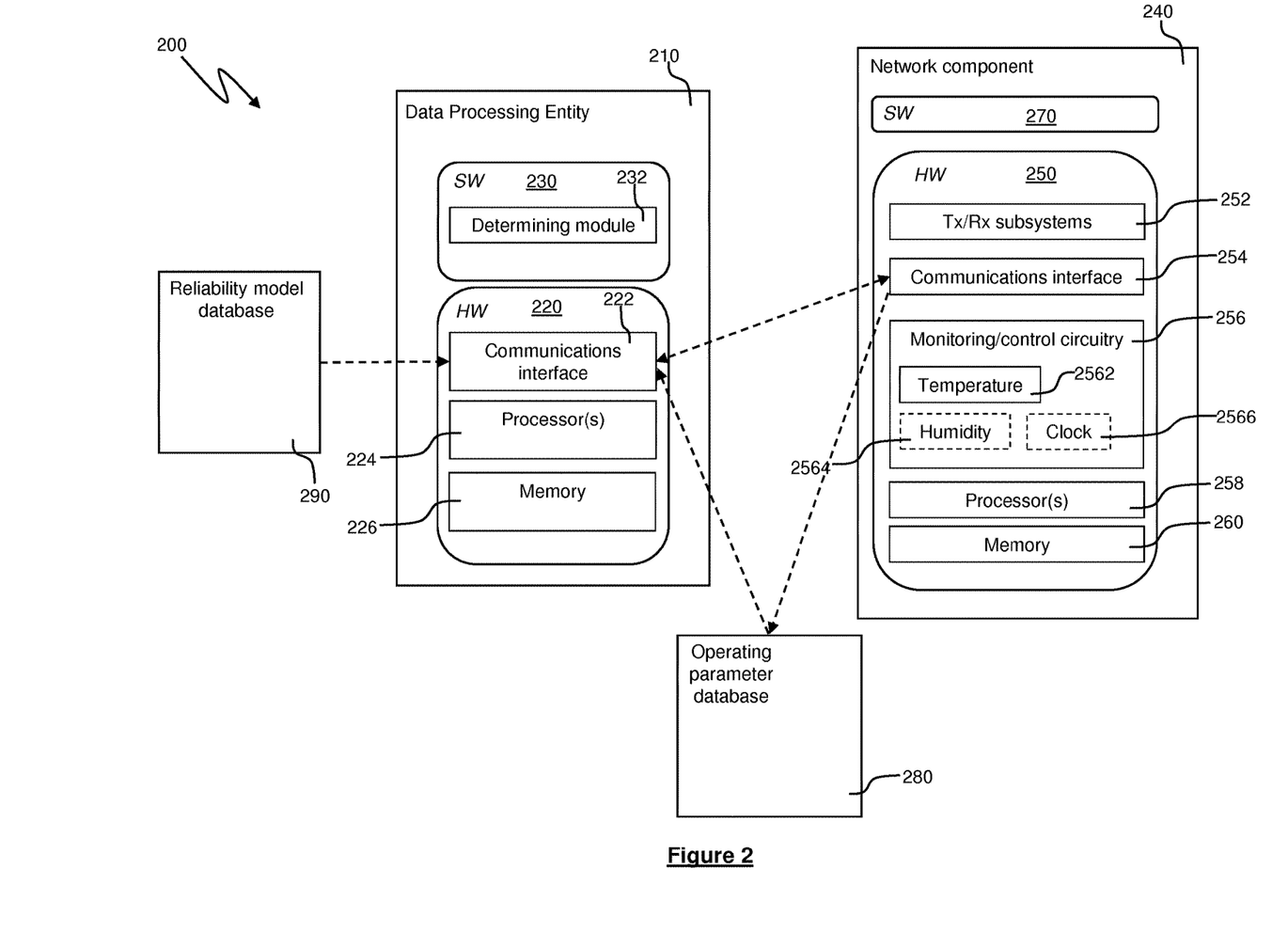
FIG. 2 is a schematic representation of a system for determining reliability information for a network component of a telecommunications network.

Referring now to FIG. 2, a system for determining reliability information for a network component of a telecommunications network taking into account actual operating conditions experienced by the network component in operation is shown generally at 200. The system 200 includes a data processing entity 210, a network component 240, an operating parameter database 280 and a reliability model database 290.

The data processing entity 210 may be provided as part of a network management system which is used to manage a telecommunications network to which the network component 240 belongs. Alternatively, the data processing entity 210 may be a standalone entity provided for the purpose of determining reliability of network components such as the network component 240.

The data processing entity 210 includes hardware 220, including a communications interface 222 by means of which the data processing entity 220 is able to communicate with the network component 210 and the operating parameter database 280. The communications interface 222 may be a wired or wireless communications interface, and may operate under any communications protocol suitable for data transfer between the data processing entity 210 and the network component 240 and between the data processing entity 210 and the operating parameter database 280.

The data processing entity 210 further includes one or more processors 224 and memory 226 for storing data and/or instructions such as software code.

The data processing entity 210 further includes software 230, which may be stored in the memory 226. The software 230 implements a determining module 232, which is operative to process sample data relating to an operating parameter that is experienced by the network component 240 over a period of time, in order to determine reliability information for the network component, as will be described in more detail below.

The network component 240 includes hardware 250 including transmit and receive subsystems 252 by means of which the network component transmits and receives data and control messages to and from other components of a network in which the network component 240 is deployed. For example, where the network component 240 is an optical transceiver, the transmit subsystem may include an optical transmitter such as a laser for transmitting optical signals to other components of the network, and the receive subsystem may include an optical detector for detecting optical signals received from other components of the network.

The hardware 250 of the network component 240 further includes a communications interface 254 by means of which the network component 250 is able to communicate with the data processing entity 210. The communications interface 254 may be a wired or wireless communications interface, and may operate under any communications protocol suitable for data transfer between the network component 240 and the data processing entity 210.

The hardware 250 of the network component 240 further includes monitoring and control circuitry 256, which is operative to control the operation of the network component 240 and to monitor operating parameters of the network component 240 in operation of the network component 240.

To this end, the monitoring and control circuitry 256 includes one or more sensors 2562, 2564 for monitoring operating parameters of the network component 240. The monitoring and control circuitry 256 may also include clock circuitry 2566 configured to generate time information such as time stamps that can be associated with operating parameter data generated by the sensors 2562, 2564.

The monitoring and control circuitry 256 includes a temperature sensor 2562 for monitoring, in use of the network component 240, a temperature of the operating environment in which the network component 240 is operating. The temperature sensor 2562 may monitor an ambient temperature in the vicinity of one or more components of the transmit and receive subsystems 252. For example, where the network component 240 is an optical component such as an optical transceiver, a temperature sensor may be provided in proximity to a laser of the optical transceiver in order to monitor the ambient temperature in the vicinity of the laser.

The monitoring and control circuitry 254 may include further sensors for monitoring other or alternative environmental parameters. For example, the monitoring and control circuitry 254 may include a humidity sensor 2564 for monitoring, in use of the network component 240, humidity of the operating environment in which the network component 240 is operating. The monitoring and control circuitry 254 may determine any one or more environmental parameters, e.g. one or more of temperature or humidity. References to temperature may be considered as a reference to any one or more environmental parameter.

The network component 240 further includes one or more processors 258 and memory 260 for storing data and/or instructions such as software code.

The memory 260 is configured to store operating parameter data generated by the sensors 2562, 2564 of the monitoring and control circuitry 254 of the network component 240. For example, the memory 260 may be configured to store samples of temperature data, each sample comprising a value generated by the temperature sensor representing the measured temperature. Each temperature data sample is associated in the memory 260 with a time stamp indicating a time at which the sample was generated.

The memory 260 may additionally be configured to store samples of humidity data, each sample comprising a value generated by the humidity sensor representing the measured humidity. Each humidity data sample is associated in the memory 260 with a time stamp indicating a time at which the value was generated.

The memory 260 is also configured to store data including inventory data that identifies the network component 240, such as a serial number of the network component 240, a manufacturer's part number of the network component 240, a production lot number of the network component 240 and the like.

The network component 240 further includes software 270, which may be stored in the memory 260. The software 270, when executed by the processor(s) 258, controls the operation of the network component 270.

The operating parameter database 280 is configured to store operating parameter data generated by the sensors 2562, 2564 of the monitoring and control circuitry 254 of the network component 240, such as the temperature and humidity data samples and their associated time stamps discussed above. The operating parameter database 280 may be updated periodically with new operating parameter data from the memory 260 of the network component 240. For example, the data processing entity 210 may transmit a request via its communications interface 222 to the network component 240 at predetermined intervals, and in response to this request the network component 240 may cause operating parameter data stored in its memory 260 to be copied to and stored in the operating parameter database 280. Inventory data identifying the network component 240 may also be copied to and stored in the operating parameter database 280 and associated in the operating parameter database 280 with the stored operating parameter data for the network component 240 in response to the request.

The operating parameter database 280 is shown in FIG. 2 as being separate from the data processing entity 210 and the network component 240, and in communication with the data processing entity 210 and the network component 240 through their respective communications interfaces 222, 254. However, it is to be appreciated that the operating parameter database 280 could be provided in the data processing entity 210 (e.g. stored in the memory 226) or in the network component 240 (e.g. stored in the memory 260), or could be provided in or as part of some other component or entity of a network, such as a network management system.

The reliability model database 290 stores reliability model data provided by a supplier of the network component 240. The reliability model data stored in the reliability model database 290 may include notional reliability information generated by a supplier for the network component 240, such as a notional mean time to failure (MTTF) for the network component 240. The reliability model data stored in the reliability model database 290 may also include parameters used by the supplier of the network component 240 to generate the notional reliability information, such as an activation energy value and a reference temperature value. The reliability model data stored in the reliability model database 290 is associated in the reliability model database with data identifying a network component or class of network components to which the reliability model data relates, such as a manufacturer part number, a range of serial numbers, a manufacturer lot number or the like.

The reliability model database 290 is shown in FIG. 2 as being separate from the data processing entity 210 and the network component 240, and in communication with the data processing entity 210 through its communications interface 222. However, it is to be appreciated that the reliability model database 290 could be provided in the data processing entity 210 (e.g. stored in the memory 226) or in the network component 140 (e.g. stored in the memory 260), or could be provided in or as part of some other component or entity of a network, such as a network management system.

Referring now to FIG. 3, a method performed by the data processing entity 210 for determining reliability information for a network component 240, taking into account the actual operating conditions experienced by the network component 240 in operation, is shown generally at 300.

In a first step 310 of the method, a plurality of samples of operating parameters of the network component 240 acquired over a period of time are obtained. For example, the plurality of samples may be retrieved by the data processing entity 210 from the operating parameter database 280. Alternatively, the plurality of samples may be obtained by the data processing entity 210 directly from the memory 260 of the network component 240. For example, the data processing entity 210 may send a request to the network component 240, to which the network component 240 responds by retrieving the plurality of samples from its memory 260 and transmitting them in a response message to the data processing entity 210. Alternatively, the network entity 240 may periodically retrieve the plurality of samples from its memory 260 and transmit them to the data processing entity 210 without requiring the data processing entity 210 to send a request to the network component 240.

The plurality of samples may be a plurality of temperature values generated by the temperature sensor 2562 of the monitoring and control circuitry 256 of the network component 240 over time, and/or may be a plurality of humidity values generated by the humidity sensor 2564 of the monitoring and control circuitry 256 of the network component 240 over time. The time stamps associated with the temperature and/or humidity values may also be obtained by the data processing entity 210 from the operating parameter database 280 with the plurality of temperature and/or humidity values.

The method 300 continues at step 320, in which an acceleration factor corresponding to an effect of the operating parameter over time on the network component 240 is determined, based on the obtained samples.

The operating conditions experienced by the network component 240 over time, as indicated by the obtained samples, may tend to have an adverse effect on the operational lifetime of the network component 240. For example, the network component 240 may experience an ambient temperature that exceeds its rated maximum operating temperature. This adverse effect is reflected by the acceleration factor.

Conversely, the operating conditions experience by the network component 240 over time, as indicated by the obtained samples, may tend to have a beneficial effect on the operational lifetime of the network component. For example, the network component 240 may experience and ambient temperature that is below its rated maximum operating temperature of the network component 240. This beneficial effect is reflected by the acceleration factor.

The acceleration factor is determined using some of the parameters that were used to determine the notional acceleration factor used by the component supplier to calculate the notional MTTF value of the network component 240.

Thus as part of step 320, the data processing entity 210 obtains from the reliability model database 290 the notional MTTF for the network component 240 and the parameters of the reliability model required to calculate the acceleration factor. For example, where the Arrhenius model described above was used by the component supplier to calculate the notional MTTF of the network component 240, the data processing entity 210 obtains the notional acceleration factor Af from the reliability model database 290, in addition to the notional MTTF value.

The acceleration factor corresponding to the effect of the operating parameter over time on the network component 240 can then be calculated by the data processing entity 210, in this example, according the equation:

$$A_{f\_}eq = \frac{1}{t-use} \int_0^{t-use} Af(Tu(t))dt,$$

where:
$A_{f\_}eq$ is value of the acceleration factor;
t−use is a total time period covered by the plurality of samples obtained at step 310 (which can be determined from the time stamps associated with the obtained samples); Af is the notional acceleration factor for the network component 240 obtained from the reliability model database 290; and Tu(t) is a value of a sample of the operating parameter at time t;

Once the value of the acceleration factor has been determined, a further step 330 is performed, in which reliability information is determined based on the determined acceleration factor. For example, the reliability information may be a mean time to failure (MTTF) value $MTTF_u$, which may be obtained by multiplying the notional MTTF value obtained from the reliability model database 290 by the acceleration factor determined at step 320:

$MTTF_u = MTTF_{spec} * A_{f\_}eq$, where $MTTF_{spec}$ is the notional MTTF for the network component.

It is to be noted that the Arrhenius model described above is merely one example of a reliability model that may be used by a component supplier to determine notional reliability information such as the notional MTTF value of a network component 240, and that other models could equally be employed by component suppliers. For example, the Exponential-Arrhenius model, requiring one additional parameter, or the Weibull-Arrhenius model, requiring two or three additional parameters, could be used to determine the notional MTTF or other reliability information. The method described above with reference to FIG. 3 is able to determine reliability information such as a MTTF value which takes account of the actual operating conditions experienced by the network component 240, provided that the additional parameters are stored in the reliability model database 290 and can be obtained therefrom by the data processing entity 210.

In a further example, the model for the acceleration factor corresponding to the effect of the operating parameter over time may be based on one or more thresholds. For example, if the operating parameter exceeds a threshold, e.g. a threshold temperature, the acceleration factor takes a predetermined value per unit time. A determination of the time for which the operating parameter exceeds the threshold provides the value of the acceleration factor.

In some aspects, the model for the acceleration factor is pre-determined, e.g. by the component manufacturer. Examples of the disclosure utilize the model to calculate a mean time to failure for a component during use, i.e. before failure, based on the actual operating parameters of the component over time. As such, a more accurate determination of replacement time due to the particular conditions experienced by the component is provided.

As discussed above, the data processing entity 210 may be operative to retrieve a plurality of samples of an operating parameter experienced by the network component 240 over a period of time from the operating parameter database 280. The operating parameter database 280 may itself be updated at predetermined intervals with new operating parameter data from the memory 260 of the network component 240.

Figure 4:
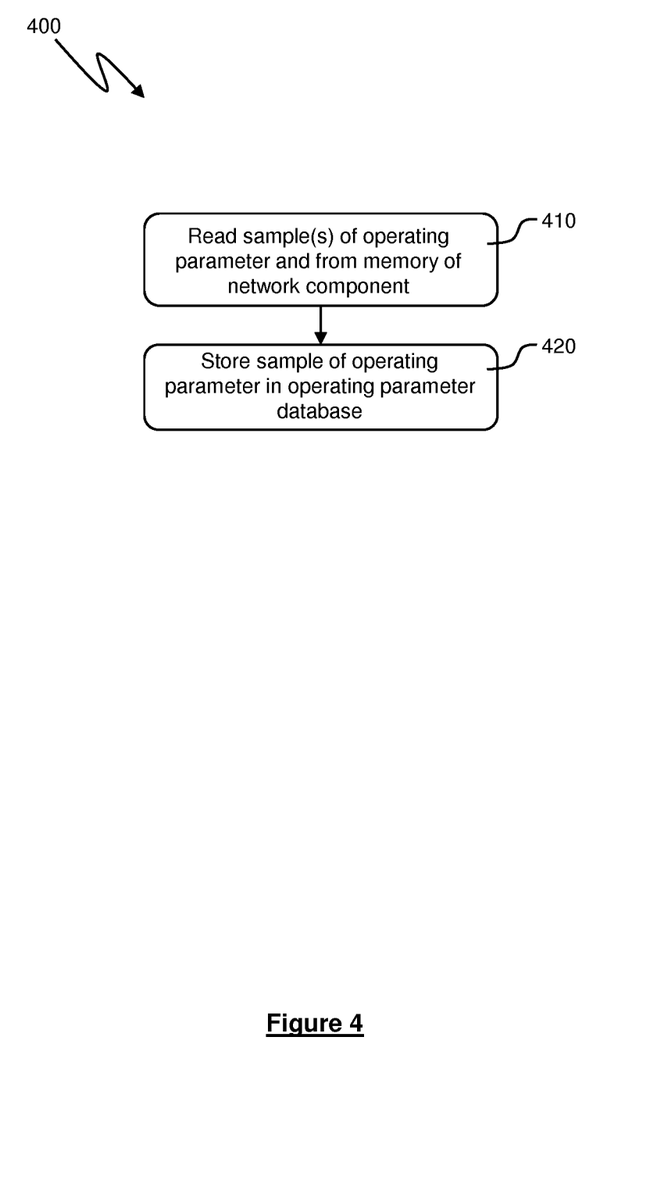
FIG. 4 is a flow diagram showing steps in a method for updating an operating parameter database.

This is illustrated in the flow diagram of FIG. 4, which shows steps in a method 400 for updating the operating parameter database 280 with new operating parameter data.

At step 410, one or more samples of an operating parameter are read from the memory 260 of the network component 240 by the processor 258. This step may be performed in response to a request transmitted by the data processing entity 210 to the network component 240, for example. Alternatively, the software 270 of the network component 240 may be configured to cause the network component 240 to read the one or more samples from the memory 260.

A time stamp associated with each of the samples may also be read from the memory 260 by the processor 258 in this step. Inventory data identifying the network component 240 may also be retrieved from the network component 240 by the processor 258 in this step.

At step 420 the samples that have been read from the memory 260 are stored in the operating parameter database 280. For example, the operating parameter database 280 may receive the samples from the network component 240 and write them to appropriate locations in the operating parameter database 280.

Any time stamps associated with the samples that were read in step 410 may also be stored in the operating parameter database 280 in this step. Similarly, any inventory data retrieved in step 410 may be associated with the samples and stored in the operating parameter database 280 in this step.

The method 400 is repeated at predetermined intervals to ensure that the operating parameter database 280 is regularly updated with samples of the operating parameter experienced by the network component 240.

The reliability information determined by the system 200 and method 300 can be used, in conjunction with network management information, for a variety of network management purposes, for example to identify network components that are nearing the end of their operational life, or to identify geographical locations where a network component is stressed because the operating conditions experienced by the network component in use regularly deviate from those for which the deployed network component is specified, or where a network component is relaxed or over-specified for the geographical location in which it is deployed, as the operating conditions experienced by the network component in use do not approach those for which the network component is specified.

Figure 5:
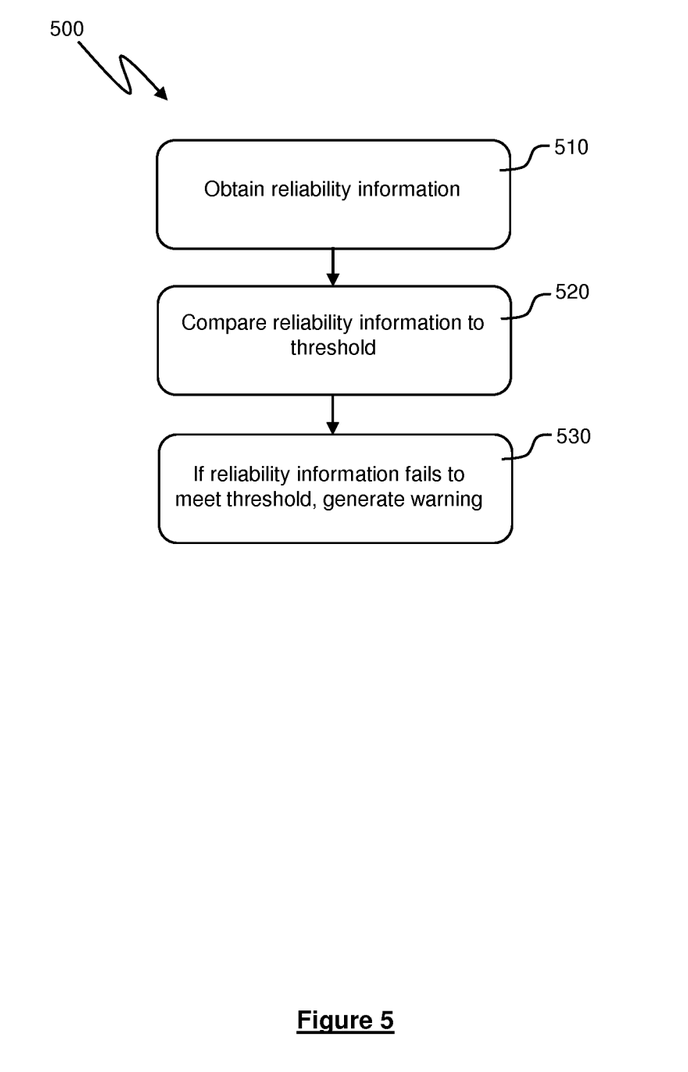
FIG. 5 is a flow diagram illustrating steps performed in a network management method to identify a network component that is experiencing operating conditions which exceed its specification.

FIG. 5 is a flow diagram illustrating steps performed, for example by the data processing entity 210 or by a network management system, in a network management method to identify a network component that is experiencing operating conditions that exceed its specification.

At step 510, reliability information for a network component 240 is obtained, for example using the method 300.

At step 520, the obtained reliability information is compared to a threshold. For example, where the reliability information is a MTTF value determined as described above with reference to FIG. 3, the MTTF value may be compared to a threshold MTTF value.

The threshold value MTTF value may be selected to represent an expected MTTF of the network component 240 in normal operating conditions, taking into account the amount of time for which the network component 240 has already been in operation. The threshold MTTF value may be a predetermined number of days, for example.

At step 530, a warning is generated if the reliability information fails to meet the threshold. For example, if the reliability information is a determined MTTF value and the threshold is a threshold MTTF value, this may be indicative that the operating conditions experienced by the network component 240 in use may exceed its specification and, as a result, the network component 240 may be deteriorating at an accelerated rate and may require replacement with a replacement network component that is specified for the operating conditions experienced by the network component. A warning can be generated in such circumstances to prompt the network operator to investigate and take any remedial action that may be required.

Figure 6:
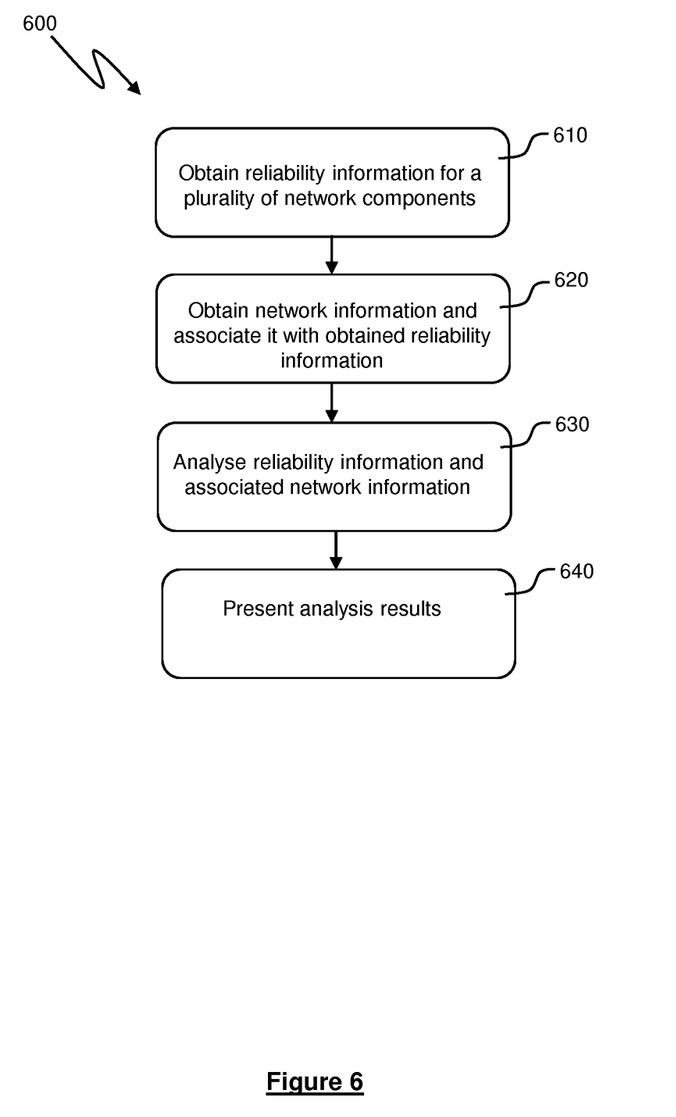
FIG. 6 is a flow diagram illustrating steps performed in a network management method for managing a network containing a plurality of network components.

FIG. 6 is a flow diagram illustrating steps performed, for example by the data processing entity 210 or by a network management system, in a network management method for managing a network containing a plurality of network components.

In a first step 610 reliability information is obtained for a plurality of network components 240, for example using the method 300 for each of the plurality of network components.

In step 620, network information is obtained, e.g. from a network information database, and is associated with the reliability information obtained for each of the plurality of network components. The network information may include, for example, geographical location information for a network components of the network, which can be associated with the reliability information obtained for each of the plurality of network components by matching network component serial number data associated with the reliability information to network component serial number data associated with the geographical location information. In this way, the reliability information for a particular network component can be associated with the geographical location of that network component.

At step 630, the reliability information and the associated network information is analysed, for example to identify stressed or relaxed network components or geographical locations, or to identify maintenance requirements such as network components that are approaching the end of their operational life.

At step 640, the results of the analysis 630 are presented, for example graphically on a display of a network management system, thereby allowing the network operator rapidly to appreciate operating conditions in the network and potential issues arising from those operating conditions, and to take any remedial action that may be required.

As will be apparent from the discussion above, the methods disclosed herein may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

As will be appreciated from the foregoing discussion, the system and method disclosed herein provides a mechanism for obtaining reliability information for network components that takes into account the actual operating conditions experienced by network components in use. This improved reliability information can be used for a variety of purposes, including efficiently provisioning a spare parts inventory, proactively identifying and resolving maintenance issues in the network and accurately specifying network components for particular geographic locations according to the actual operating conditions that will be experienced in use.

It should be noted that the above-mentioned embodiments illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality. Any reference signs in the claims shall not be construed so as to limit their scope.

The invention claimed is:

1. A method of predictively warning of an impending device failure in a network component of a telecommunications network, the method comprising:
    obtaining a plurality of samples of an operating parameter of the network component acquired over a period of time;
    determining a value of an acceleration factor based on the plurality of samples, the acceleration factor being a measure of an effect of the operating parameter over time on the network component, wherein the value of the acceleration factor is based on the period of time, a notional acceleration factor obtained from a reliability model of the network component, and the plurality of samples;
    obtaining a notional Mean Time to Failure (MTTF) for the network component;
    generating an MTTF based on the determined value of the acceleration factor and the notional MTTF;
    comparing the MTTF to a threshold; and
    responsive to the MTTF satisfying the threshold, generating a warning indicating the impending device failure.

2. The method of claim 1, wherein the operating parameter comprises an environmental parameter of an operating environment of the network component.

3. The method of claim 1, further comprising:
    obtaining, at predetermined intervals, a sample of the operating parameter from the network component; and
    storing the sample of the operating parameter in a database.

4. The method of claim 3, wherein the obtaining the plurality of samples of the operating parameter comprises obtaining the plurality of samples of the operating parameter from the database.

5. The method of claim 1, wherein the generating the MTTF comprises:
    determining the value of the acceleration factor according to the equation:

$$A_{f\_eq} = \frac{1}{t-use} \int_0^{t-use} Af(Tu(t))dt,$$

where:
    $A_{f\_eq}$ is the value of the acceleration factor;
    t−use is a total time period covered by the plurality of samples;
    Af is the notional acceleration factor obtained from the reliability model of the network component; and
    $Tu(t)$ is a value of a sample of the operating parameter at time t; and
    determining the MTTF according to the equation: $MTTF_u = MTTF_{spec} * A_{f\_eq}$, where $MTTF_{spec}$ is the notional MTTF for the network component.

6. The method of claim 1, further comprising:
    obtaining network management information relating to a network in which the network component is deployed; and
    using the MTTF in conjunction with the obtained network management information to:
        determine maintenance requirements of the network component; and/or
        identify a stressed or relaxed location in the network.

7. The method of claim 1, wherein the network component comprises an optical transceiver.

8. An apparatus of predictively warning of an impending device failure in a network component of a telecommunications network, the apparatus comprising:
    processing circuitry;
    memory containing instructions executable by the processing circuitry whereby the apparatus is operative to:
        obtain a plurality of samples of an operating parameter of the network component acquired over a period of time;
        determine a value of an acceleration factor based on the plurality of samples, the acceleration factor being a measure of an effect of the operating parameter over time on the network component, wherein the value of the acceleration factor is based on the period of time, a notional acceleration factor obtained from a reliability model of the network component, and the plurality of samples;
        obtain a notional Mean Time to Failure (MTTF) for the network component;
        generate an MTTF based on the determined value of the acceleration factor and the notional MTTF;
        compare the MTTF to a threshold; and
        responsive to the MTTF satisfying the threshold, generate a warning indicating the impending device failure.

9. The apparatus of claim 8, wherein the operating parameter comprises an environmental parameter of an operating environment of the network component.

10. The apparatus of claim 8, wherein the instructions are such that the apparatus is operative to:

obtain a sample of the operating parameter from the network component at predetermined intervals; and store the sample of the operating parameter in a database.

11. The apparatus of claim 8, wherein the instructions are such that, to generate the MTTF, the apparatus is operative to:

determine the value of the acceleration factor according to the equation:

$$A_{f\_}eq = \frac{1}{t-use}\int_0^{t-use} Af(Tu(t))dt,$$

where:
$A_{f\_}eq$ is the value of the acceleration factor;
t-use is a total time period covered by the plurality of samples;
Af is the notional acceleration factor obtained from the reliability model of the network component; and
Tu(t) is a value of a sample of the operating parameter at time t; and determine the MTTF according to the equation: $MTTF_u = MTTF_{spec} * A_{f\_}eq$, where $MTTF_{spec}$ is the notional MTTF for the network component.

12. The apparatus of claim 8, wherein the instructions are such that the apparatus is further operative to:

obtain network management information relating to a network in which the network component is deployed; and use the MTTF in conjunction with the obtained network management information to:
determine maintenance requirements of the network component; and/or
identify a stressed or relaxed location in the network.

13. The apparatus of claim 8, wherein the network component comprises an optical transceiver.

14. A system of predictively warning of an impending device failure in a network component of a telecommunications network, the system comprising:

data processing circuitry configured to:
obtain a plurality of samples of an operating parameter of the network component acquired over a period of time;
determine a value of an acceleration factor based on the plurality of samples, the acceleration factor being a measure of an effect of the operating parameter over time on the network component, wherein the value of the acceleration factor is based on the period of time, a notional acceleration factor obtained from a reliability model of the network component, and the plurality of samples;
obtain a notional Mean Time to Failure (MTTF) for the network component;
generate an MTTF based on the determined value of the acceleration factor and the notional MTTF;
compare the MTTF to a threshold; and
responsive to the MTTF satisfying the threshold, generate a warning indicating the impending device failure.

* * * * *